Dec. 27, 1966  F. G. BACK  3,294,471
OPTICALLY COMPENSATED VARIFOCAL LENS ASSEMBLY
Filed June 5, 1963

INVENTOR.
FRANK G. BACK
BY Albert F. Kronman
ATTORNEY

United States Patent Office 3,294,471
Patented Dec. 27, 1966

3,294,471
OPTICALLY COMPENSATED VARIFOCAL LENS ASSEMBLY
Frank G. Back, 55 Sea Cliff Ave., Glen Cove, N.Y. 11542
Filed June 5, 1963, Ser. No. 285,726
1 Claim. (Cl. 350—194)

This invention relates to varifocal lens structures and particularly to an optically compensated varifocal lens arrangement for use in television cameras. The invention has particular reference to the means for compensating for the aberration generally introduced into such a lens when the focal length is changed.

Varifocal lenses are well known in the art and have been used for some time in the field of television, motion picture photography, and for still cameras. Some of the prior art lenses have been limited to disclosure of image shift compensation only and have considerable aberrations during the shift from one focal length to another.

Aberrational correction in an optically compensated varifocal system is much more difficult than in an ordinary lens because the image defects change with the focal length but not proportionally to it. Some aberrations change in the same sense as the focal length, others change inversely. In addition, the power of each fixed and movable lens group is determined by the zoom compensation. The customary method of correcting aberrations by changing one radius and restoring the required powers by changing another radius which contributes relatively little to this aberration can therefore not be used in optically compensated varifocal lens systems.

Accordingly, it is an object of the present invention to provide a varifocal lens for use with television cameras which avoids some of the disadvantages and limitations of prior art lenses.

Another object of the invention is to increase the range of the focal length so that a larger accommodation of image magnifications is available.

Another object of the invention is to provide highly satisfactory color correction, both lateral and longitudinal for all focal length settings.

A feature of the present invention is its use of an air lens associated with each cemented surface in the lens system.

Another feature of the present invention is its use of a relay to compensate for the constant aberrational residues.

The invention consists of the construction, combination and arrangement of parts, as herein illustrated, described and claimed.

In the accompanying drawings, forming a part hereof, is illustrated one complete embodiment of the invention and in which.

Figure 1:
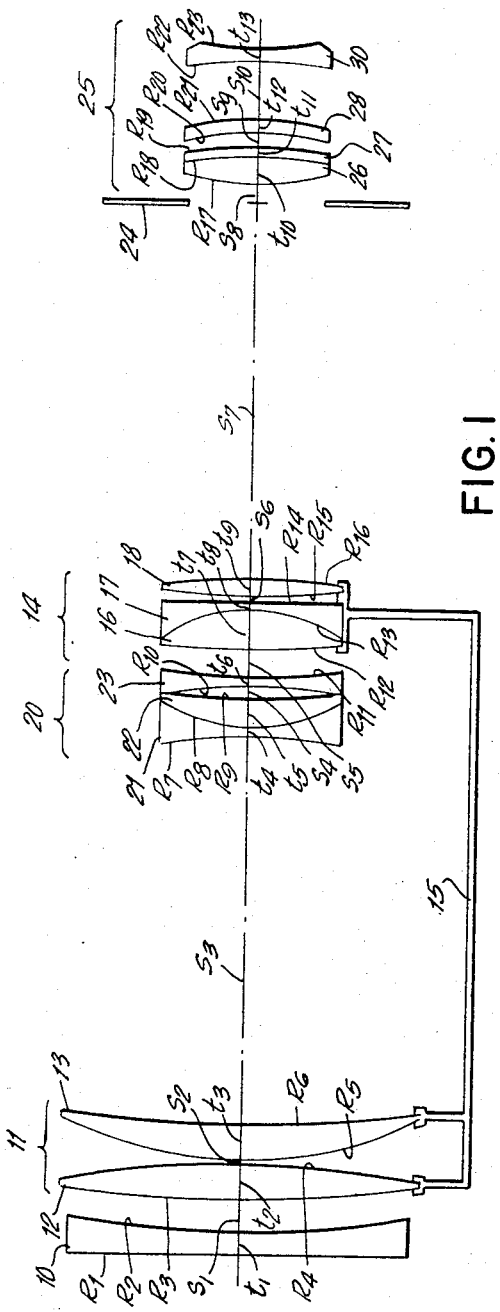
FIGURE 1 is a view in longitudinal section of a complete optically compensated embodiment of the present invention showing the movable elements in the forward or telephoto position.

Referring now to the drawings, the lens system includes a negative front lens 10 behind which there is mounted an axially movable lens assembly 11, generally known in the art as the variator. The variator includes two spaced positive lenses 12 and 13. A fixed air space $S_2$ of the order of 0.25% of the maximum focal length of the whole system is provided between the variator lenses 12, 13, said lenses being disposed with their larger contributing powers facing the fixed air space $S_2$. The variator lenses 12, 13, have an outer front surface $R_3$, an outer rear surface $R_6$, an inner front surface $R_4$, and an inner rear surface $R_5$, said surfaces having a power distribution according to the following relationship; the sum of the absolute value of the curvatures of said inner front and rear surfaces facing the fixed air space between the variator lenses being at least twice but not more than five times the sum of the absolute value of the curvatures of said outer front surface and said outer rear surface facing variable air spaces to fulfill the condition:

$$2\left(\frac{1}{R_3}+\frac{1}{R_6}\right)<\left(\left|\frac{1}{R_4}\right|+\frac{1}{R_5}\right)<5\left(\frac{1}{R_3}+\frac{1}{R_6}\right)$$

where $R_3$ and $R_6$ are each substantially equal to 1.2% of the maximum focal length of the whole system. A lens or lens system hereinafter referred to as a compensator 14 is coupled to the variator by a mechanical coupling 15 well known in the varifocal lens art so that the two may be moved together to change the focal length of the lens system. The compensator 14 includes three lenses 16, 17 and 18. A fixed air space $S_6$ is provided between the lenses 17 and 18 of the order of 0.2% of the maximum focal length of the whole system. Between the movable lens groups 11 and 14, there is positioned a fixed lens assembly 20 which is generally known as the erector. The erector includes three lenses 21, 22 and 23. A fixed air space $S_4$ is provided between lenses 22 and 23 of the order of 0.6% of the maximum focal length. The first and second erector lens elements have an outer front surface $R_7$ facing the variable air space $S_3$ between the variator and erector, and an outer rear surface $R_{11}$ facing the variable air space $S_5$ between the erector and compensator, an inner front surface $R_9$, and an inner rear surface $R_{10}$, both facing the fixed air space $S_4$ between the erector elements, 22, 23, said surfaces having a power distribution according to the following relationship: the sum of the absolute values of the curvatures of said inner front and rear surfaces facing the air space $S_4$, being at least 1½ times but not more than 2.0 times the sum of the absolute values of the curvatures of said outer front surface facing the variable air space toward the variator and the outer rear surface the variable air space opposite the compensator to fulfill the condition:

$$\frac{1}{2}\left(\left|\frac{1}{R_7}\right|+\frac{1}{R_{11}}\right)<\left(\frac{1}{R_9}+\left|\frac{1}{R_{10}}\right|\right)<2\left(\left|\frac{1}{R_7}\right|+\frac{1}{R_{11}}\right)$$

where the absolute value of $R_9$ is at least ¾ but not more than 1¼ times the maximum focal length of the whole system and the absolute value $R_{10}$ is at least ¼ but not more than ½ of the maximum focal length of the whole system.

An iris stop 24 is located close behind the compensator array 14 when in its wide angle position. A group of four lenses 25, generally known as a relay, is mounted behind the stop 24 and includes one positive lens 26 and three negative lenses 27, 28 and 30. The relay 25 acts to bring the image into its proper position on the image plane. The relay has a major influence on the position of the focal length of the entire system. Generally relays have had their strong negative components enclosed by one or more positive components. However, for the purpose of the present invention, it has been found necessary to provide a relay combination which consists of only one positive lens followed by three negative lenses.

Figure 2:
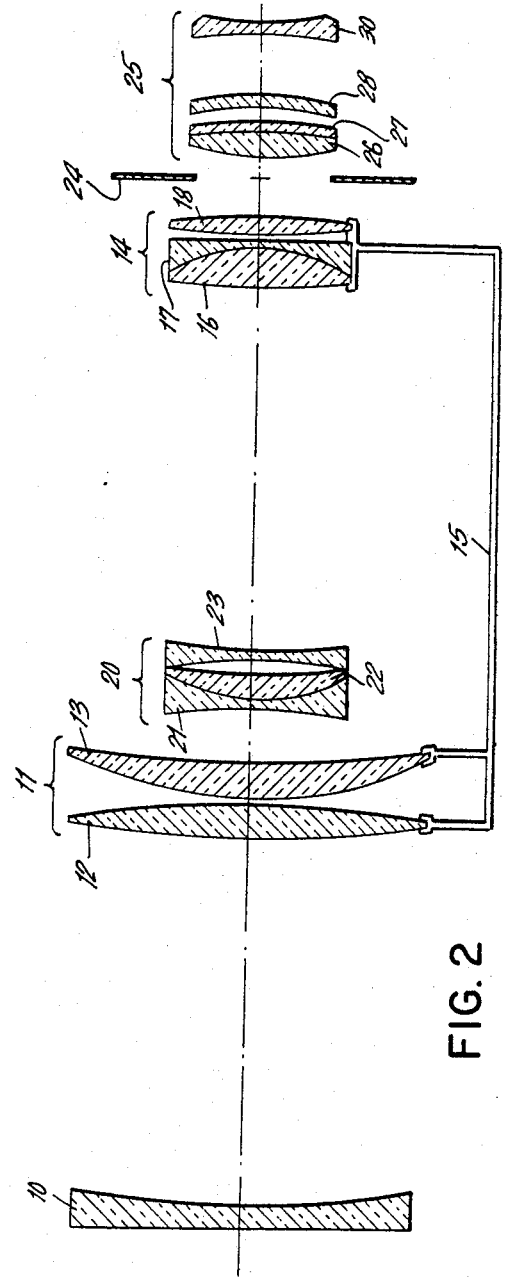
FIGURE 2 is a view similar to FIGURE 1 showing the movable elements in the rear or wide angle position.

The lens assembly shown in FIGURES 1 and 2 consists of a negative front lens 10, the front surface $R_1$ of which has a radius of curvature at least three times the maximum focal length of the whole system, and the rear surface $R_2$ having a radius of curvature at least equal to ½ the maximum focal length of the whole system, a positive variator lens group 11, a negative erector lens group 20, and a positive compensator lens group 14 followed by a diaphragm stop and a positive relay 25. In order to achieve four point image shift compensation with equally spaced points of full compensation and minimum zoom deviation, the powers of the variator 11 and compensator 14, are substantially equal while the absolute value of the power of the erector 20 is about twice that of the compensator 14.

In the example shown, the variator has a power of +7.25 diopters and the compensator a value of +7.75 diopters. The stationary erector 20 positioned between the movable variator 11 and compensator 14 has a power of −14.125 diopters. The power of the front lens 10 and the power of the relay 25 have no influence on the zoom range nor the zoom deviation but does of course, determine the focal length. This fact is well known in the art and is fully explained in United States and Foreign Patents.

In a varifocal lens, since the image defects change with the focal length but not proportionally to it, some aberrations change directly as the focal length changes, other aberrations change inversely; that is, a decrease in focal length produces an increase in aberrations. How these aberrations change depends upon the design of the lens system, whether the movable and fixed components are positive or negative and whether or not their aberrations are positive or negative. Also, the power of each fixed and movable lens group is determined by zoom compensation.

The basic correction for a varifocal lens must be directed to the reduction of longitudinal and lateral color defects. In the present invention this is done by introducing two cemented surfaces, one surface $R_{13}$ between movable lenses 16 and 17 and the other surface $R_8$ between fixed lenses 21 and 22. Each of these combinations includes two glasses having the same refractive index but different dispersions. A change of the radius of curvature of the cemented surface has no effect on the focal length but does change the color defects. This compensation means is known in the art but other corrective effects are also needed. In order to obtain both the color correction and correction of monochromatic aberrations, an air lens is associated with each cemented surface. The first of these is the air lens formed by surfaces $R_{14}$ and $R_{15}$ having an axial thickness of $S_6$. The second air lens lies between surfaces $R_9$ and $R_{10}$ and having a thickness of $S_4$.

It has been found that the best aberrational correction can be achieved if the power of the erector 20 is equally distributed between the cemented and uncemented components and if the radius of curvature $R_7$ of the front surface is more than 0.5 but less than equal to the radius of curvature $R_{11}$ of the rear surface. Also, the curvatures $R_9$ and $R_{10}$ enclosing the fixed air lens should have a ratio of more than 1.00 but less than 2.00. These relationships can be written:

$$\frac{1}{2} < |R_7/R_{11}| < 1$$

$$1 < |R_9/R_{10}| < 2$$

The fixed air lens in the erector (between lenses 22, 23) has negative power and is substantially equal to the power of the two erector components. In the compensator assembly 14 the cemented doublet 16, 17, has about one-fourth of the power of the single element 18. The power of the air lens between lenses 17 and 18 and having a radii of curvatures of $R_{14}$ and $R_{15}$, lies between the powers of the enclosing glass lenses and is positive. The ratio of the two radii $R_{14}$ to $R_{15}$, is more than 8.0 but less than 10.0. These relationships may be written:

$$\phi 17 < \phi 17\text{-}18 < \phi 18$$

where $\phi$ is the power in diopters.

$$8 < |R_{14}/R_{15}| < 10.0$$

Also, in the compensator group 14, the ratio of the front radius of curvature $R_{12}$ to the rear radius of curvature $R_{16}$ is more than two but less than 3.

$$2 < |R_{12}/R_{16}| < 3$$

The following table gives the optical characteristics of the system shown in the drawing and described above:

| Lens No. | Radius R (in mm.) | Thickness (t) Air Spacing (s) | Glass Cat. Ref. | Index of Ref., ND | Dispersion V |
|---|---|---|---|---|---|
| Front Lens: | | | | | |
| 10 | $R_1 = -1474.665$ | $t_1 = 8.4$ | SFS-4 | 1.7408 | 28.15 |
|  | $R_2 = 268$ | $s_1 = 8.914$ | | | |
| Variator: | | | | | |
| 12 | $R_3 = 552.181$ | $t_2 = 10.0$ | SK-16 | 1.62081 | 60.4 |
|  | $R_4 = -294.349$ | $s_2 = 1.0$ | | | |
| 13 | $R_5 = 120.929$ | $t_3 = 11.0$ | SK-16 | 1.62081 | 60.4 |
|  | $R_6 = 570.929$ | $s_3 = 115.671$ | | | |
| Erector: | | | | | |
| 21 | $R_7 = -154.410$ | $t_4 = 3.0$ | LAK-10 | 1.72062 | 50.3 |
| 22 | $R_8 = 39.970$ | $t_5 = 10.5$ | SF-18 | 1.72127 | 29.3 |
|  | $R_9 = 307.16$ | $s_4 = 2.9$ | | | |
| 23 | $R_{10} = -187.939$ | $t_6 = 4.12$ | LAK-10 | 1.72062 | 50.3 |
|  | $R_{11} = 262.709$ | $s_5 = 6.085$ | | | |
| Compensator: | | | | | |
| 16 | $R_{12} = 459.78$ | $t_7 = 12.68$ | SK-16 | 1.62081 | 60.4 |
| 17 | $R_{13} = -44.549$ | $t_8 = 2.50$ | F-2 | 1.62081 | 36.2 |
|  | $R_{14} = -2252.556$ | $s_6 = 1.0$ | | | |
|  | $R_{15} = 244.899$ | | | | |
| 18 | | $t_9 = 5.5$ | SK-16 | 1.62081 | 60.4 |
|  | $R_{16} = -167.83$ | $s_7 = 112.43$ | | | |
| Stop | | $s_8 = 5.0$ | | | |

See notes at end of table.

| Lens No. | Radius R (in mm.) | Thickness (t) Air Spacing (s) | Glass Cat. Ref. | Index of Ref., ND | Dispersion V |
|---|---|---|---|---|---|
| Relay: | | | | | |
| 26 | $R_{17}=59.01$ | $t_{10}=8.0$ | BK-7 | 1.517 | 64.5 |
|  | $R_{18}=-102.34$ | $t_{11}=3.0$ | F-2 | 1.6208 | 36.2 |
| 27 | $R_{19}=-167.83$ | $s_9=4.25$ | | | |
|  | $R_{20}=-61.65$ | $t_{12}=4.0$ | SF-18 | 1.72127 | 29.3 |
| 28 | $R_{21}=-67.749$ | $s_{10}=18.5$ | | | |
|  | $R_{22}=-149.69$ | $t_{13}=2.8$ | SK-16 | 1.62081 | 60.4 |
| 30 | $R_{23}=56.7$ | | | | |

In the above table the symbols designate the following:
ND equals Refractive index for sodium D lines. LAK equals Lanthanum Crown.
V equals Abbé's dispersion number. SF equals Dense Flint.
SFS equals Special Dense Flint (Shott Glass). F equals Flint.
SK equals Dense Crown. BK equals Borosilicate Crown.

The focal length of the lens combination can be varied from a maximum value of 470.50 mm. as shown in FIGURE 1 to a minimum value of 78.40 mm. thereby producing a range of six to one. The back focal length is 100.70 mm. The movable lenses travel 102 mm. from the maximum to minimum value.

Having thus fully described the invention, what is claimed as new and desired to be secured by Letters Patent of the United States, is:

A varifocal lens system for television cameras comprising, in the order of the direction of the incident light, a front lens, a front section of variable focal length including an axially slidable air spaced variator and compensator, a stationary erector therebetween, an aperture stop spaced from the front section, and a rear section of fixed focal length including a relay having three elements therein said lens system having optical characteristics of the following order wherein ND is the refractive index for the D line, V is Abbé's dispersion number, SFS stands for Special Dense Flint, SK indicates Dense Crown, LaK stands for Lanthanum Crown, SF stands for Dense Flint, F indicates Flint and BK stands for Borosilicate Crown, $R_1$ to $R_{23}$ are the respective radii of refracting lens surfaces numbered from front to rear of the lens system $t_1$ to $t_{13}$ are the respective axial thicknesses and $s_1$–$s_{10}$ are the respective separations from the front to the rear of the lens system:

| Lens No. | Radius R (in mm.) | Thickness (t) Air Spacing (s) | Glass Cat. Ref. | Index of Ref., ND | Dispersion V |
|---|---|---|---|---|---|
| Front Lens: | | | | | |
| 10 | $R_1=-1474.665$ | $t_1=8.4$ | SFS-4 | 1.7408 | 28.15 |
|  | $R_2=268$ | $s_1=8.914$ | | | |
| Variator: | | | | | |
| 12 | $R_3=552.181$ | $t_2=10.0$ | SK-16 | 1.62081 | 60.4 |
|  | $R_4=-294.349$ | $s_2=1.0$ | | | |
|  | $R_5=120.929$ | | | | |
| 13 | $R_6=570.929$ | $t_3=11.0$ | SK-16 | 1.62081 | 60.4 |
|  |  | $s_3=115.671$ | | | |
| Erector: | | | | | |
| 21 | $R_7=-154.410$ | $t_4=3.0$ | LAK-10 | 1.72062 | 50.3 |
|  | $R_8=39.970$ | | | | |
| 22 | $R_9=307.16$ | $t_5=10.5$ | SF-18 | 1.72127 | 29.3 |
|  |  | $s_4=2.9$ | | | |
|  | $R_{10}=-187.939$ | | | | |
| 23 | $R_{11}=262.709$ | $t_6=4.12$ | LAK-10 | 1.72062 | 50.3 |
|  |  | $s_5=6.085$ | | | |
| Compensator: | | | | | |
| 16 | $R_{12}=459.78$ | $t_7=12.68$ | SK-16 | 1.62081 | 60.4 |
|  | $R_{13}=-44.549$ | $t_8=2.50$ | F-2 | 1.62081 | 36.2 |
| 17 | $R_{14}=-2252.556$ | $s_6=1.0$ | | | |
|  | $R_{15}=244.899$ | | | | |
| 18 | $R_{16}=-167.83$ | $t_9=5.5$ | SK-16 | 1.62081 | 60.4 |
|  |  | $s_7=112.43$ | | | |
| Stop | | $s_8=5.0$ | | | |
| Relay: | | | | | |
| 26 | $R_{17}=59.01$ | $t_{10}=8.0$ | BK-7 | 1.517 | 64.5 |
|  | $R_{18}=-102.34$ | $t_{11}=3.0$ | F-2 | 1.6208 | 36.2 |
| 27 | $R_{19}=-167.83$ | $s_9=4.25$ | | | |
|  | $R_{20}=-61.65$ | $t_{12}=4.0$ | SF-18 | 1.72127 | 29.3 |
| 28 | $R_{21}=-67.749$ | $s_{10}=18.5$ | | | |
|  | $R_{22}=-149.69$ | $t_{13}=2.8$ | SK-16 | 1.62081 | 60.4 |
| 30 | $R_{23}=56.7$ | | | | |

Equivalent focal length of the whole system—(EFL)=f= 78.40 to 470.50.
Back focal length of whole system=100.7.
Radius, thickness and spacing in millimeters.

References Cited by the Examiner

UNITED STATES PATENTS 3,011,403  12/1961  Dlutzik _____ 88—57

JEWELL H. PEDERSEN, *Primary Examiner.*

R. J. STERN, *Assistant Examiner.*